Nov. 18, 1924.

G. CRISSON

MEASURING INSTRUMENT FOR VACUUM TUBES

Filed Sept. 9, 1921

1,515,660

INVENTOR
G. Crisson
BY
ATTORNEY

Patented Nov. 18, 1924.

1,515,660

UNITED STATES PATENT OFFICE.

GEORGE CRISSON, OF HACKENSACK, NEW JERSEY, ASSIGNOR TO AMERICAN TELEPHONE AND TELEGRAPH COMPANY, A CORPORATION OF NEW YORK.

MEASURING INSTRUMENT FOR VACUUM TUBES.

Application filed September 9, 1921. Serial No. 499,363.

*To all whom it may concern:*

Be it known that I, GEORGE CRISSON, residing at Hackensack, in the county of Bergen and State of New Jersey, have invented certain Improvements in Measuring Instruments for Vacuum Tubes, of which the following is a specification.

This invention relates to electrical measuring instruments and more especially to instruments for measuring or testing the characteristics of vacuum tubes. Its objects is to provide an apparatus embodying circuit arrangements which will permit higher accuracy than has heretofore been obtained in such measurements or tests.

In the use of vacuum tubes as amplifiers, as on signaling lines or for other purposes, there are a number of important characteristics or constants to be considered, such, for example, as the amplifying factor. Not only is it important to know these before putting a tube into use, but it is necessary from time to time to inspect or test it, and when many such tubes are in use it is desirable to have equipment which will permit of a rapid and accurate determination of the characteristics. Measuring sets have been devised for this purpose in which the amplified output or a portion thereof is compared with the input, but for measurements with alternating currents this method has not proven entirely satisfactory for the reason that in general a phase shift is introduced which leaves the input current and the output current out of phase. As a result, it is difficult to compare them with any degree of accuracy. In my invention I propose to overcome previous difficulties by making a correction for this phase shift and more specifically I accomplish this by introducing a mutual inductance between the two circuits which are to be compared, this mutual inductance being of such magnitude as to compensate for phase shift and thus permit more accurate tests or measurements.

Figure 1:
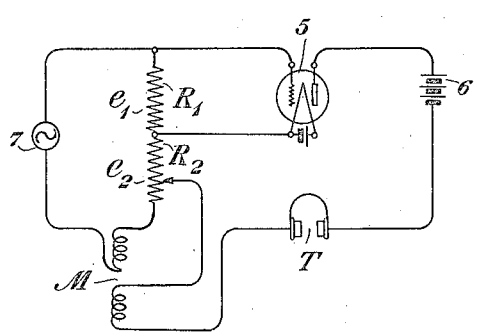
Figure 2:
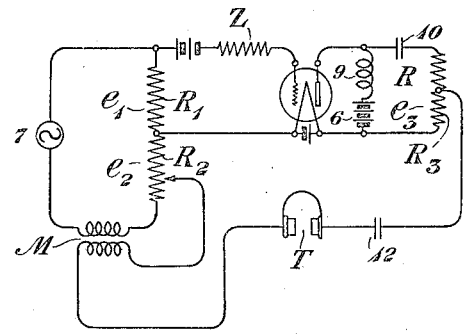
Figure 3:
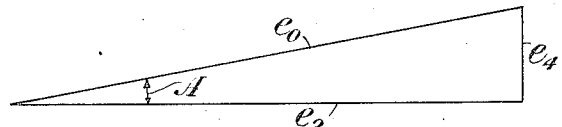
Figure 4:
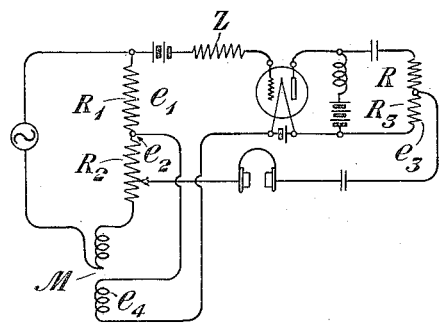
Figure 5:
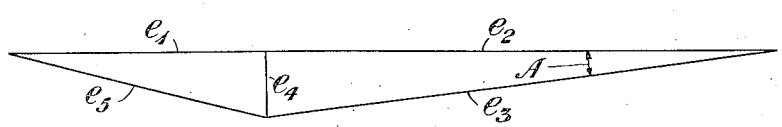

The invention will be better understood by reference to the following description and the accompanying drawing in which Figure 1 is a diagrammatic circuit of a testing set for measuring certain constants and comprising my invention. Fig. 2 is a circuit adapted for measuring other constants. Fig. 3 is a vector diagram showing certain of the electromotive forces involved in the circuit of Figs. 1 and 2. Fig. 4 is a modification of Fig. 2 and Fig. 5 is a vector diagram for certain of the electromotive forces acting in the circuit of Fig. 4.

Referring to Fig. 1 there is shown in conventional manner a vacuum tube 5 comprising the usual filament, plate and grid elements and of which tube it is desired to find the characteristics. This vacuum tube is supplied with a plate battery 6, preferably of the voltage to be used in actual operation of the tube. Alternating current of a definite frequency is supplied to the grid circuit from a source 7. The current from said source 7 is allowed to pass through two resistances, $R_1$ and $R_2$ in series, and connection is made from the terminals of the resistance $R_1$ to the grid and filament of the vacuum tube, such that if current $I_1$ is flowing through the resistances $R_1$ and $R_2$ in series, the voltage $e_1$ impressed on the input of the tube will be $I_1 R_1$. This alternating voltage impressed on the grid will cause a fluctating current to flow in the plate circuit through the telephone receiver T, producing therein a tone of the same frequency as that given by the generator 7. One terminal of the output circuit is connected adjustably to the resistance $R_2$, so that there is also introduced into this output circuit a voltage $e_2$ equal to $I_1 R_2$ which will oppose that from the output circuit of the tube. By suitable adjustment of the resistance $R_2$ it will be possible to have the two electromotive forces substantially neutralize each other, so that the tone in the receiver will reach a minimum, and under these circumstances there will be a simple relation between the electromotive force, acting as follows: If $m_0$ is the amplifying factor for the tube, there will be developed in the plate circuit of the tube, as a result of the input electromotive force $e_1$, the voltage $m_0 e_1$, and when minimum tone has been obtained in the receiver there will be the relation $m_0 I_1 R_1 = I_1 R_2$ or $$m_0 = \frac{R_2}{R_1}.$$

In null method measurements of this kind the definiteness with which balance can be established depends upon the extent to which the indicating device, such as the telephone receiver, can be brought to a zero indication. There will be an adjustment which will produce minimum tone, and which is the desired adjustment, but it is difficult to decide precisely when the tone is a minimum unless it can be reduced to zero. In the circuit described above it will be possible to reduce the tone in the telephone to zero only if the two electromotive forces in the telephone circuit are in opposite phase. In general, however, the presence of the capacities between the elements within the tube are such as to produce a slight phase displacement of the output electromotive force of the tube, and this renders accurate tests of the tube difficult. To overcome this feature and render the circuit more useful, I propose inserting into the receiver circuit an electromotive force of a phase and of a magnitude to compensate for the difference in phase of the two electromotive forces $e_2$ and $e_0$. Various methods may be used in doing this. One method is indicated in Fig. 1 where use is made of an adjustable mutual inductance M taking the form of a transformer with adjustable coupling, the primary of which is introduced in series with the oscillator 7, and the secondary of which is introduced in series with the telephone T. The current flowing through the primary of the mutual inductance will thus be equal to and in phase with the current flowing through $R_2$. The electromotive force, $e_4$ induced in the secondary of the inductance will be 90° out of phase with this current, and therefore 90° out of phase with $e_2$ when the system is balanced, so that no current flows through the telephone T. By varying the degree of coupling between the primary and secondary of the mutual inductance M, the magnitude of $e_4$ may be adjusted to compensate for the phase difference between $e_2$ and $e_0$. This is illustrated in the vector diagram of Fig. 3 in which $e_2$ and $e_0$ are plotted to a scale with a phase angle A between them. Electromotive force $e_4$, 90° out of phase with the electromotive force $e_2$, must be of such a magnitude as to close the triangle comprising these three electromotive forces. The operation of testing the vacuum tube consists in adjusting $R_2$ until a minimum tone is obtained in the telephone receiver, which, in general, will not be zero. The coupling between the windings of the mutual inductance is then adjusted for the further reduction of tone to a minimum. If necessary, further adjustments of $R_2$ and M may be continued until the tone reaches zero value, and under these circumstances it is possible to get a much more accurate setting of the resistance $R_2$.

Fig. 2 shows a different circuit arrangement for obtaining certain other constants of the tube and which at the same time includes my invention. In this circuit the vacuum tube 5 is again supplied with alternating current from the source 7 in the same manner as for Fig. 1. The output circuit of this tube, however, is in accordance with the circuit arrangements more commonly used in practice and consists of a large inductance 9 in series with the plate battery 6 through which the direct current component of the output of the tube may flow, but which offers a high impedance to alternating currents. The alternating current output is permitted to flow through a branch circuit containing an impedance R, which, in general, should be equal in magnitude to the load which the vacuum tube is intended to serve. Direct current is prevented from flowing through this branch circuit by means of the condenser 10. A potentiometer circuit is provided consisting of a connection from an intermediate point on the impedance R to an adjustable contact on the resistance $R_2$, this connection including an indicator T, such as a telephone receiver and a condenser 12, the latter to prevent the flow of direct current therethrough. The alternating current through the impedance R, which, in general, will be a pure resistance, will not only be of the same frequency as the source 7, but will, in general, correspond to a substantial amplification of the power in the input circuit.

One characteristic of the tube which it is frequently desirable to measure is the effective voltage amplifying factor which, in the circuit of Fig. 2, is the ratio of the alternating voltage across the output impedance R to the alternating voltage impressed on the input circuit, and the circuit of Fig. 2 is especially well adapted for finding this constant by a direct comparison of the two voltages by a potentiometer method. As described in connection with Fig. 1, the resistance $R_2$ is adjusted for minimum tone in the receiver. Under these circumstances $e_2 = e_3$; $e_2 = I_1 R_2$ and $$e_3 = \frac{m I_1 R_1 R_3}{R}$$

where $m$ is the effective amplifying factor defined above. Upon equating these two expressions, it appears that $$m = \frac{R R_2}{R_1 R_3}.$$

Here, again, difficulty is experienced in making accurate setting for the resistance $R_2$ because of the phase difference of the electromotive forces $e_2$ and $e_3$. In this circuit not only is there a phase shift, due to the capacities within the tube, but the reactance introduced by the coil 9 and the condenser 10 produce an additional shift. Further, in testing vacuum tubes, it is desirable that they shall be tested under conditions which closely approximate operating conditions. For most cases in which the vacuum tube is used as an amplifier, and particularly in telephone practice, the impedance of the input circuit as seen looking from the tube is quite high, being several hundred thousands of ohms. For this reason, in taking measurements on vacuum tubes it is important to introduce in the input circuit an impedance Z shown in Fig. 2, which will give an impedance as seen looking from the tube substantially equal to that which the tube faces in operation. The impedance Z, together with the capacity of the grid, introduces a further phase shift, and all the factors taken together give such a substantial shift in phase between the input and output electromotive forces as to render accurate tests of the tube practically impossible. For this reason I again introduce into the potentiometer circuit an electromotive force at right angles to $e_2$, and I do this in the same manner as described in connection with Fig. 1. The primary of the mutual inductance is connected in series with the oscillator 7, and the secondary is introduced in series with the telephone. By suitable adjustments of the coupling of the inductance, it is possible to reduce the tone in the telephone to zero. The vector diagram for the electromotive forces in the potentiometer circuit is similar to that shown in Fig. 3.

A modification of Fig. 2 is shown in Fig. 4. In this latter circuit the secondary of the mutual inductance is introduced in the input circuit, as well as in the potentiometer circuit. Under these conditions the input voltage on the tube will be $e_1+e_4$, which is $e_5$, as indicated in the vector diagram of Fig. 5. In the potentiometer circuit there will be present electromotive forces $e_2$, $e_3$ and $e_4$. When the telephone tone has been reduced to zero, the vectors $e_2$, $e_3$ and $e_4$ will form a closed triangle as shown in Fig. 5. One advantage of the circuit of Fig. 4 is that the mutual inductance necessary to give sufficient range is substantially smaller than that required for the circuit of Fig. 2.

Although in both Figs. 2 and 4 only part of the output voltage $e$ is included in the potentiometer circuit, it is obvious that any desired portion may be used even up to the whole of $e$.

While I have described this invention as applied specifically to the test or measurement of an amplfying factor of a vacuum tube, it is apparent that it can be used equally well in the measurement of any of the other characteristics of the vacuum tube in which a null method such as used here is applicable, and, therefore, I do not wish to be limited to the specific illustration given. Also, while the specification has described a method and apparatus for comparing output and input voltage it is apparent that it may be used for comparing output and input power since the output power is proportional to the square of the amplifying factor. This is especially convenient in case a constant output impedance is to be used for the potentiometer may then be calibrated to read directly in terms of power ratio. Again, in such work as telephone communication it may be desirable to express the power ratio in terms of "miles of gain" on some standard cable.

What is claimed is:

1. In a circuit for testing the characteristics of vacuum tubes, a potentiometer circuit for balancing input voltage against output voltage, and mutual inductance means for compensating for phase shift between the input and output voltage.

2. In a circuit for testing the characteristics of vacuum tubes, means for comparing the input and output voltage by a null method, and mutual inductance means for compensating for phase shift between the input and output voltage.

3. In a circuit for testing the characteristics of vacuum tubes, a potentiometer circuit for balancing output power against input power, and a mutual inductance to compensate for phase difference between input and output power.

4. In a circuit for testing the charteristics of vacuum tubes, a potentiometer circuit for balancing output voltage against input voltage, and a transformer with its primary winding in the input circuit and its secondary winding in the potentiometer circuit for compensating for phase difference between the input and output voltage.

5. In a circuit for measuring the amplifying factor of a vacuum tube comprising a potentiometer circuit, said potentiometer circuit including a resistance for introducing into it a portion of the output voltage, and including a resistance for comparing the latter with input voltage, a mutual inductance in said input circuit and potentiometer circuit for introducing into said potentiometer circuit a voltage at right angles to the input voltage to compensate for phase difference between the input voltage and the output voltage.

6. In a circuit for measuring the amplifying factor of a vacuum tube comprising a potentiometer circuit, said potentiometer circuit including a resistance for introducing into it a portion of the output voltage, and including a resistance for comparing the latter with input voltage, a transformer, the primary of which is in the input circuit and the secondary of which is in the potentiometer circuit whereby phase difference between input and output voltage is compensated.

In testimony whereof, I have signed my name to this specification this 2nd day of September, 1921.

GEORGE CRISSON.